United States Patent [19]
MacKay

[11] Patent Number: 5,081,826
[45] Date of Patent: Jan. 21, 1992

[54] UNIVERSAL SULKY HITCH

[76] Inventor: Fenton MacKay, R. R. #2, Winsloe, Prince Edward Island, Canada

[21] Appl. No.: 562,857

[22] Filed: Aug. 3, 1990

Related U.S. Application Data

[63] Continuation-in-part of Ser. No. 365,425, Jun. 13, 1989, abandoned.

[51] Int. Cl.⁵ .............................................. B68B 1/00
[52] U.S. Cl. ........................................ 54/2; 280/494
[58] Field of Search ................... 280/292, 494; 54/2, 54/50

[56] References Cited

U.S. PATENT DOCUMENTS 4,200,306  4/1980  Helms .................................. 280/494
4,664,403  5/1987  Livingston ..................... 280/494 X

FOREIGN PATENT DOCUMENTS 1345770  11/1963  France .............................. 280/494
8904260   5/1989  PCT Int'l Appl. ................. 280/494

Primary Examiner—Robert P. Swiatek
Attorney, Agent, or Firm—Hoffman, Wasson and Gitler

[57] ABSTRACT

A hitch for connecting a sulky shaft to a harness girth on a horse comprises a pair of brackets affixed to the girth, with a pivotable yoke pivotally mounted between the brackets on a vertical bolt. A horizontal bolt, extending through arms of the yoke, pivotably supports an element which is connected to the sulky shaft by means of an L-shaped pin having a pivoting connection to a hole in the sulky shaft, providing universal movement between the sulky shaft and the harness.

8 Claims, 5 Drawing Sheets

UNIVERSAL SULKY HITCH

This application is a continuation-in-part of copending U.S. patent application Ser. No. 365,425, filed June 13, 1989, and now abandoned.

BACKGROUND OF THE INVENTION

This invention relates to a hitch for connecting the shafts of a sulky to a horse harness or girth.

Many devices are known which provide a fixed, or simple pivoting attachment between a horse and s ulky shaft. However, when both shafts are affixed to the girth in his manner, any movement of the horse other than smiple forward motion will cause the sulky to fishtail or pull against the horse, thereby slowing the horse, particularly when the horse is leading into a turn of a race track.

Prior inventors have addressed various objects of this invention. U.S. Pat. No. 4,473,991, for exmaple, shows a ball-and-socket type universal connector that is connected to a harness and can be coupled to a sulky shaft.

U.S. Pat. No. 4,480,428 discloses a quick-disconnect spring biased pin coupling for a sulky.

Various types of universal couplings, not intended for sulky use, are described in other patents, including U.S. Pat. No. 4,548,423, U.S. Pat. No. 4,261,592, U.S. Pat. No. 1,557,841, and U.S. Pat. No. 4,711,461.

None of the above provides the combination of universal movement, simple construction, and easy connection and disconnection afforded by the present invention.

SUMMARY OF THE INVENTION

It is an object of this invention to provide a simple but secure universal connection between a horse and each shaft of a sulky pulled by the horse, to provide the horse a greater degree of freedom with respect to the sulky, and to isolate the sulky from twisting and turning movements of the horse.

Another object is to provide a hitch which can be easily and quickly connected and disconnected.

This invention employs the principle of a universal joint to provide optimal mobility between the shafts without affecting the performance of the sulky. By providing each shaft with a universal connection to the girth, the horse can enjoy considerably greater freedom between the shafts, while remaining firmly connected to them at all times.

The invention is particularly advantageous for maintaining stability of the sulky in turns. Furthermore, the hitch described herein absorbs the relative movement between the harness and the sulky, which results from natural movement of the horse during each stride. The drag and fishtailing that occur when the sulky shafts are rigidly attached to the harness are thereby reduced.

BRIEF DESCRIPTION OF THE DRAWINGS

In the accompanying drawings.

DESCRIPTION OF THE PREFERRED EMBODIMENT

Figure 1:
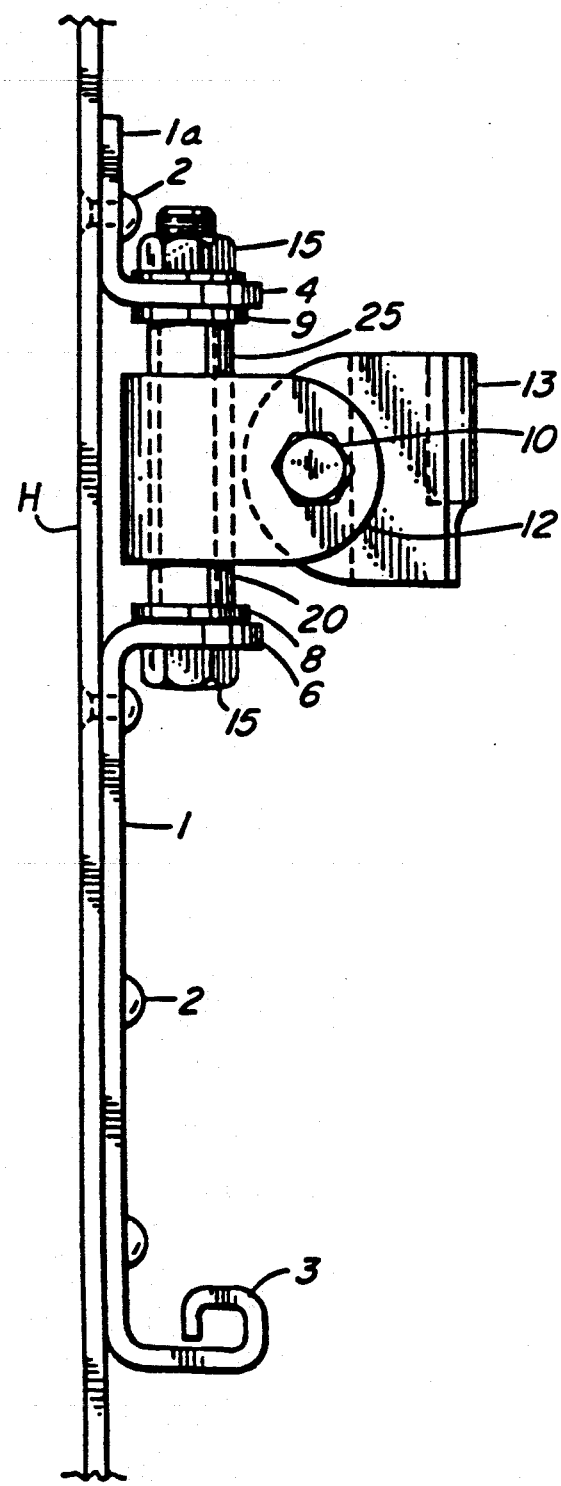
FIG. 1 is a side elevation of a hitch embodying the invention.
Figure 2:
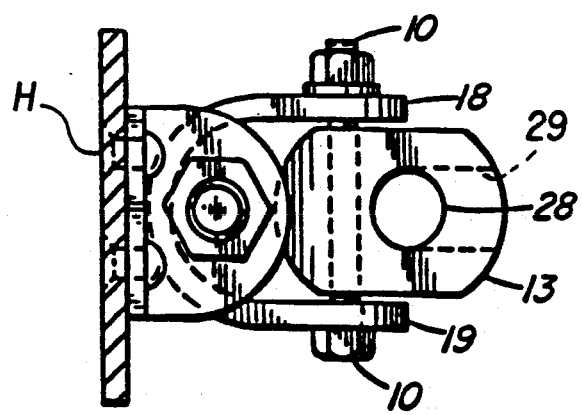
FIG. 2 is a top view thereof.
Figure 3:
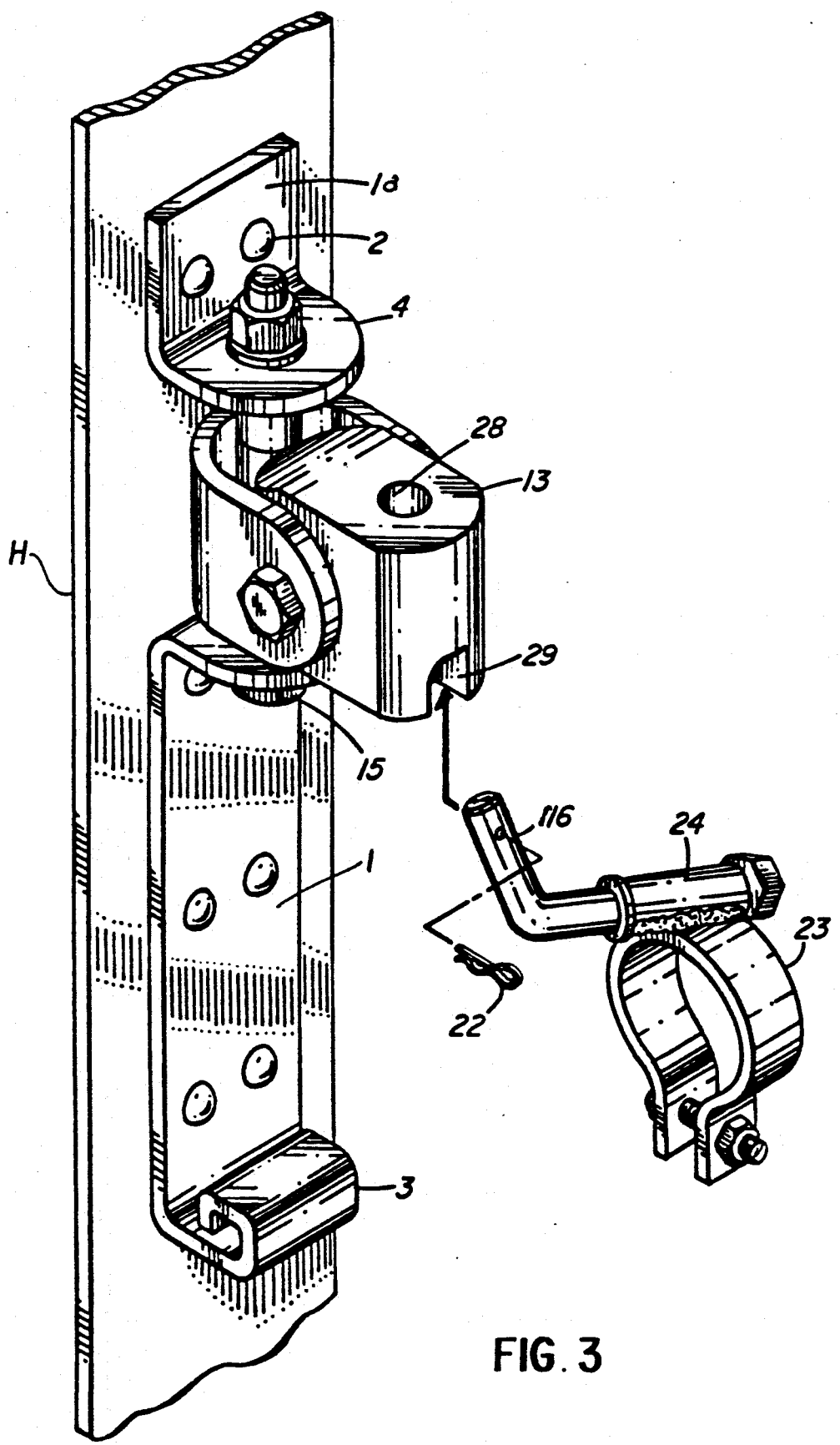
FIG. 3 is an isometric view thereof.
Figure 4:
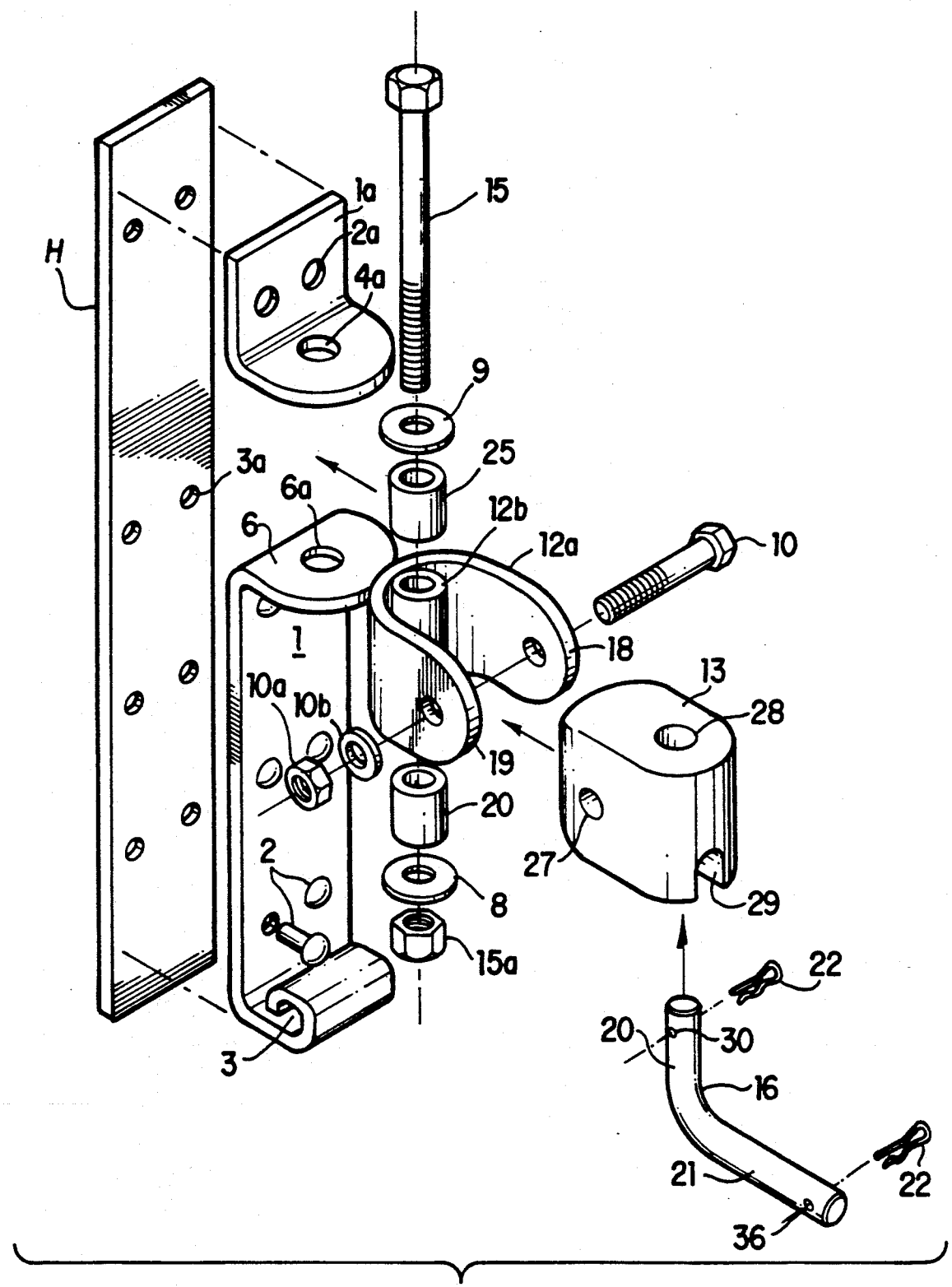
FIG. 4 is an exploded view corresponding to FIG. 3, except that the installed position of the bolts are reversed.
Figure 6:
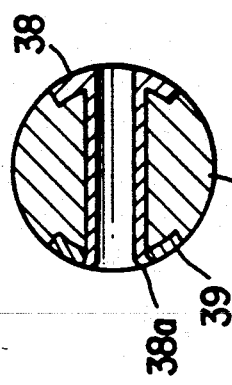
FIG. 6 is a sectional view taken along the line VI—VI in FIG. 5.

The invention is embodied in a universal hitch which, as illustrated in FIGS. 1-4, comprise a lower bracket 1 and an upper bracket 1a, each of whic is connected to a harness H by means of fasteners such as rivets 2 installed through holes 2a in therespective brackets and corresponding holes 3a in the harness. A reinforcing plate (not shown) may be provided within or behind the harness, in which case the rivets extend through holes in the plate. The lower bracket has a pair of tabs 3 and 6, one at each end of the bracket, extending away from the harness. The lower tab 3 is foled over aon itself as shown to provide a reatining channel for a safety line (not shown). The upper tab 6 is substantially "D" shaped, when viewed from above as in FIG. 2, and has a central hole 6a (FIG. 4). The upper bracket 1a has a correspondingly shaped tab 4, having a central hole 4a; there is a gap between the tabs 4 and 6 to accept elements of the hitch described below.

The moving portion of the hitch includes a yoke 12, which comprises a "U"-shaped member 12a and a cylindrical member 12b affixed thereto, as by welding, between the arms 18 and 19 of the "U". The yoke is retained between the tabs 4 and 6 on a first bolt 15, which is secured by a nut 15a. Spacers 20 and 25, and washers 8 and 9, are placed over the bolt 15 on either side of member 12b, inboard of the tabs. The yoke is therefore free to pivot around the vertical axis of the bolt 15.

Between the yoke's arms 18 and 19, here is a metal or plastic block 13, which can pivot with respect to the yoke about the horizontal axis of a second bolt 10, which extends through a hole 27 in the block, and aligned holes in the ends of the yoke arms 18 and 19.

Since the yoke pivots about a vertical axis, and the block pivots on a horizontal axis with respect to the yoke, the block has two degress of pivoting freedom. A third degree of freedom is provided by a 90° clevis pin 16, shown at the bottom right of FIG. 1. This pin has a vertical leg 20 and a horizontal leg 21, whose axis is perpendicular to the axes of both bolts 10 and 15. The ends of the pin 16 have holes 30 and 36 therein which receive spring pins 22, once the device is fully assembled. When the pin is installed in the block, the upper spring pin retains the elbow of the pin in a slot 29 at the bottom of the block, extending from the hole 28 outward from the horse. This slot prevents the pin from rotating with respect to the block; however, there is no such constraint between the horizontal leg 21 of the pin and the sulky shaft. And, as the axis of the lower leg of the pin is mutually perpendicular to the axes of the two bolts 10 and 15, the shaft enjoys three degrees of (universal) rotational freedom with respect to the harness, but no translational freedom.

Figure 5:
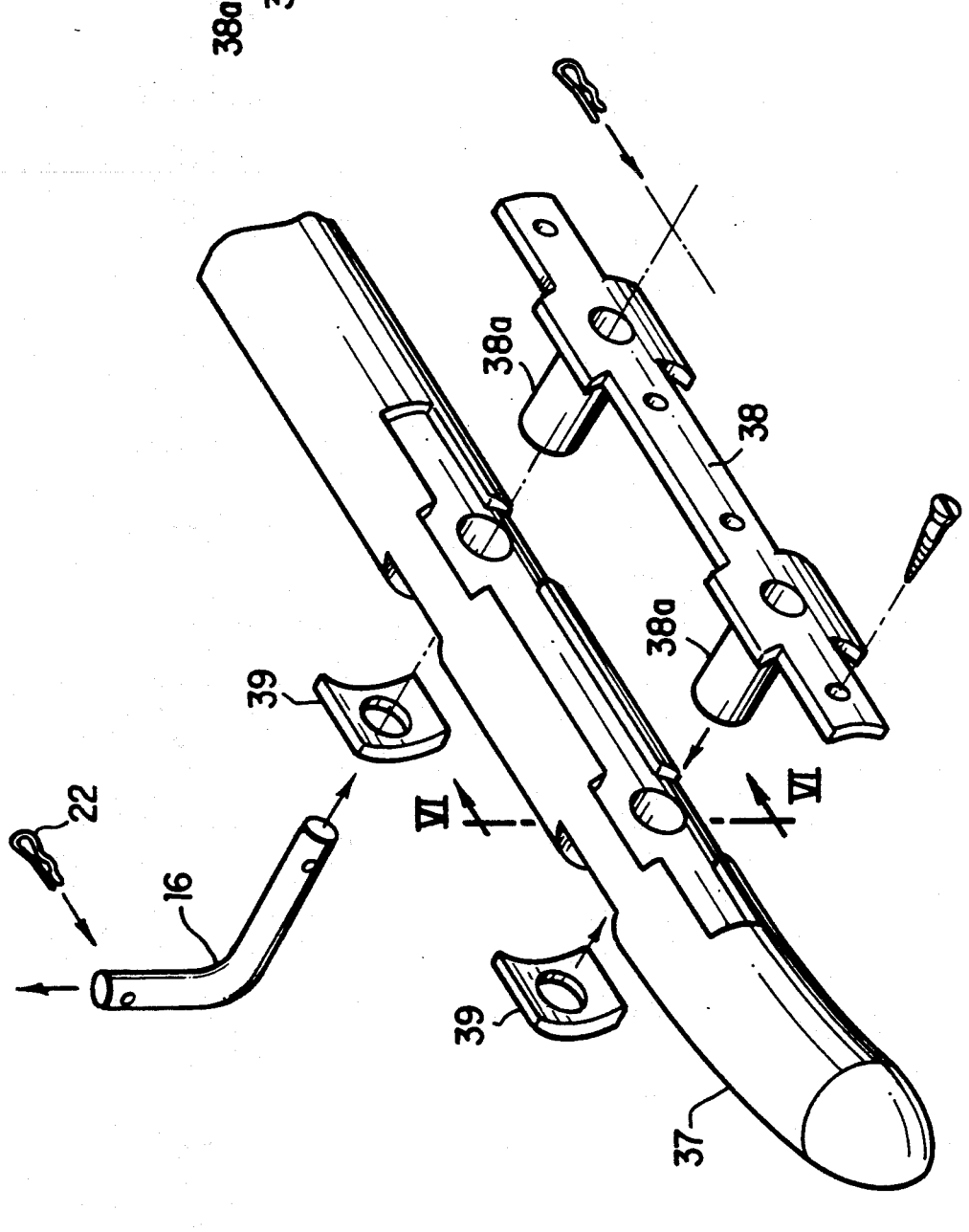
FIG. 5 is an exploded perspective view of a sulky shaft, provided with fixtures for receiving a pin portion of the hitch.

As shown in FIGS. 5 and 5, the shaft 37 of the sulky is recessed on both sides to receive metal fixtures 38 and 39. The major fixture 38 may be attached to the shaft by screws, as shown, and the ends of the sleeves 38a are deformed outward as shown against the countersunk holes in he fixtures 39. The fixturse shown provide two holes, only one of which is used at any time, to provide some length adjustability; any other number of holes could be provided.

Figure 7:
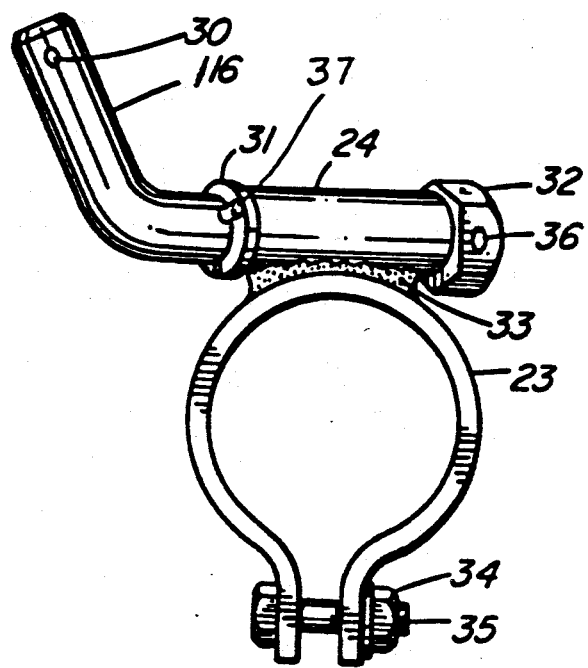
FIG. 7 is a side elevation of an alternative sulky shaft.
Figure 8:
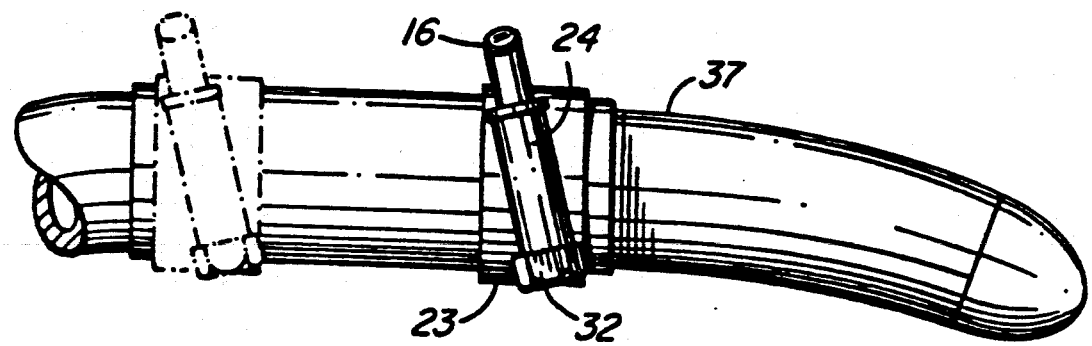
FIG. 8 is an end view thereof.

FIGS. 7 and 8 show an alterantive form of the invention, comprising a clamp that is slidably installed on the shaft ends. The clamp includes a band 23, which may be tightened around the shaft by means of a bolt 35 and nut 34; a sleeve 24 is welded to the band at 33, and a pin 116, corresponding in function to the pin 16 previously described, passes through the sleeve, being retained therein by a head 32 at one end, and a pin 37 and thrust ring 31 at the other end of the sleeve.

In operation, the girth with a universal hitch attached on each side thereof is mounted on the horse in the usual manner. As shown in FIG. 5, the sulky shafts are brought into position adjacent the hitches. The pin 16 (or 116) is then inserted into the slot 29 and passage 28, until the end of the pin emerges from the passage 28. A cotter pin 22 is then inserted into hole 30, to maintain the pin 16 in position. The procedure is then repeated to connect the other sulky shaft to the other side of the harness by means of a similar hitch.

Inasmuch as the invention is subject to modifications and variations, it is intended that the foregoing description and the accompanying drawings shall be interpreted as illustrative of only one form of the invention, whose scope is to be measured by the following claims.

I claim:

1. A hitch for connecting a shaft of a sulky to a harness of a horse, comprising
    at least oen bracket to be affixed to the harness,
    a first member mounted on said at least one bracket, said first member being pivotable relative to said at least one bracket about a verticla axis,
    a second member mounted on said first member, said second member being pivotable about a horizontal axis relative to said first member, and
    means for connecting said second member to a shaft of said sulky,
    wherein said first member is a yoke having a pair of arms, and said second member is a block pivotably mounted between said arms.

2. The invention of claim 1, wherein said second member has a hole therein, and said connecting means comprises a pin retained in said hole and extending through said shaft.

3. The invention of claim 1, wherein said second member has a hole therein, and said connecting means comprises a pin retained in said hole and extending through a fixture on said shaft.

4. The invention of claim 1, wherein said yoke is mounted upon a first shaft extending vertically through said at least one bracket, and said block is mounted upon a second shaft passing horizontally through the arms of said yoke.

5. The invention of claim 4, wherein said shafts are bolts.

6. The invention of claim 1, wherien said block has a vertical through hole for receiving a pin, said block also having a slot cut in its lower face, said slot extending from said hole away from said at least one bracket, and wherein said pin has a vertical leg passing through said hole, and a horizontal leg passing through said slot, said slot serving to prevent rotation of said pin with respect to said block.

7. The invention of claim 6, further comprising a clamp mountable on said shaft, said clamp comprising a band and a sleeve attached thereto for receiving one end of said pin.

8. The invention of claim 6, further comprising at least one fixture mounted on said shaft, and providing a hole extending through said shaft for receiving said pin.

* * * * *